US008705520B2

(12) United States Patent
Chin et al.

(10) Patent No.: US 8,705,520 B2
(45) Date of Patent: *Apr. 22, 2014

(54) METHODS AND APPARATUS TO PROTECT AND AUDIT COMMUNICATION LINE STATUS

(71) Applicant: AT&T Intellectual Property I, LP, Atlanta, GA (US)

(72) Inventors: Jae-Sun Chin, San Antonio, TX (US); Michael Raftelis, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/705,852

(22) Filed: Dec. 5, 2012

(65) Prior Publication Data

US 2013/0100959 A1    Apr. 25, 2013

Related U.S. Application Data

(63) Continuation of application No. 11/788,129, filed on Apr. 19, 2007, now Pat. No. 8,340,086.

(51) Int. Cl.
*H04M 11/00* (2006.01)

(52) U.S. Cl.
USPC ..................... 370/360; 379/100.05

(58) Field of Classification Search
None
See application file for complete search history.

(56) References Cited

U.S. PATENT DOCUMENTS

| | | | |
|---|---|---|---|
| 5,046,181 A * | 9/1991 | Higuchi et al. ............... | 370/360 |
| 5,184,345 A | 2/1993 | Sahni | |
| 5,195,086 A | 3/1993 | Baumgartner et al. | |
| 5,436,957 A | 7/1995 | McConnell | |
| 5,454,033 A | 9/1995 | Hahn et al. | |
| 5,689,641 A | 11/1997 | Ludwig et al. | |
| 5,806,032 A | 9/1998 | Sproat | |
| 5,936,744 A | 8/1999 | Choi | |
| 6,256,116 B1 | 7/2001 | Nawrocki | |
| 6,490,349 B1 * | 12/2002 | Garfinkel et al. ........ | 379/265.02 |
| 6,560,323 B2 | 5/2003 | Gainsboro | |
| 6,668,044 B1 | 12/2003 | Schwartz et al. | |
| 6,697,614 B2 | 2/2004 | Dorenbosch | |
| 6,721,059 B1 | 4/2004 | Sturgeon et al. | |
| 6,810,116 B1 | 10/2004 | Sorensen et al. | |

(Continued)

FOREIGN PATENT DOCUMENTS

| | | |
|---|---|---|
| JP | 2001119405 | 4/2001 |
| WO | 03071774 | 8/2003 |
| WO | 2005013596 | 2/2005 |

OTHER PUBLICATIONS

Yuan, "How Integrated do You Want to be Today," Call Center Demo & Conference, Jan. 1, 2000, 5 pages.

(Continued)

*Primary Examiner* — Hassan Phillips
*Assistant Examiner* — Ajay Cattungal
(74) *Attorney, Agent, or Firm* — Hanley, Flight & Zimmerman, LLC

(57) ABSTRACT

Methods and apparatus to protect and audit communication line status are disclosed. An example method includes receiving a set of available communication lines from a media gateway, associating a plurality of destination numbers with respective ones of the available communication lines, and dialing the plurality of destination numbers from the media gateway to identify the communication line status information.

20 Claims, 10 Drawing Sheets

(56) References Cited

U.S. PATENT DOCUMENTS

| | | |
|---|---|---|
| 6,820,055 B2 | 11/2004 | Saindon et al. |
| 6,850,609 B1 | 2/2005 | Schrage |
| 6,853,716 B1 | 2/2005 | Shaffer et al. |
| 6,865,264 B2 | 3/2005 | Berstis |
| 6,879,671 B2 | 4/2005 | Schmid et al. |
| 6,931,113 B2 | 8/2005 | Ortel |
| 6,961,857 B1 | 11/2005 | Floryanzia |
| 7,006,616 B1 | 2/2006 | Christofferson et al. |
| 7,035,387 B2 | 4/2006 | Russell et al. |
| 7,039,395 B2 | 5/2006 | Kundaje et al. |
| 7,043,001 B2 | 5/2006 | Moisey et al. |
| 7,113,580 B1 | 9/2006 | DellaMorte, Sr. et al. |
| 7,466,334 B1 | 12/2008 | Baba |
| 2002/0083462 A1 | 6/2002 | Arnott |
| 2002/0085700 A1 | 7/2002 | Metcalf |
| 2002/0161579 A1 | 10/2002 | Saindon et al. |
| 2003/0040917 A1 | 2/2003 | Fiedler |
| 2003/0072429 A1 | 4/2003 | Slobodin et al. |
| 2003/0088619 A1 | 5/2003 | Boundy |
| 2003/0091026 A1* | 5/2003 | Penfield et al. ............... 370/352 |
| 2003/0140121 A1 | 7/2003 | Adams |
| 2003/0223562 A1 | 12/2003 | Cui et al. |
| 2004/0052218 A1 | 3/2004 | Knappe |
| 2004/0086101 A1 | 5/2004 | Katz |
| 2004/0186712 A1 | 9/2004 | Coles et al. |
| 2004/0207884 A1 | 10/2004 | Chen |
| 2005/0012966 A1 | 1/2005 | Mitchell et al. |
| 2005/0021344 A1 | 1/2005 | Davis et al. |
| 2005/0074008 A1 | 4/2005 | Herledan et al. |
| 2005/0152524 A1 | 7/2005 | Carlson et al. |
| 2005/0185777 A1* | 8/2005 | Russell et al. ............... 379/111 |
| 2006/0133354 A1 | 6/2006 | Lee |
| 2006/0160395 A1* | 7/2006 | Macauley et al. ............ 439/344 |
| 2006/0165068 A1 | 7/2006 | Dalton, Jr. et al. |
| 2007/0058795 A1 | 3/2007 | Arrant et al. |
| 2007/0116213 A1* | 5/2007 | Gruchala et al. ......... 379/100.01 |
| 2007/0133549 A1* | 6/2007 | Lee et al. ...................... 370/392 |
| 2007/0172047 A1 | 7/2007 | Coughlan et al. |
| 2007/0206759 A1 | 9/2007 | Boyanovsky |
| 2008/0260121 A1 | 10/2008 | Chin et al. |

OTHER PUBLICATIONS

Speech Technology Magazine, "Virtual Assistants: Speech's Next "Killer App"," Dec./Jan. 1999, 5 pages.

Atlanta Business Chronicle, "Secretaries may be obsolete as high-tech assistants debut," Jul. 15, 1996, 3 pages.

Amarex Products, "VSP Products," Copyright 1999, 4 pages.

Silberstang, "Building Reliable Intelligent Peripheral/Service Node," Copyright 1999, 14 pages.

United States Patent and Trademark Office, "Final Office Action," issued in connection with U.S. Appl. No. 11/250,713, mailed Aug. 19, 2009, 18 pages.

United States Patent and Trademark Office, "Non-Final Office Action," issued in connection with U.S. Appl. No. 11/250,713, mailed Jan. 13, 2009, 21 pages.

United States Patent and Trademark Office, "Non-Final Office Action," issued in connection with U.S. Appl. No. 11/364,918, mailed Aug. 3, 2009, 17 pages.

Bittlingmeier et al., "CompTIA Security+ Exam: Devices, Media, and Topology Security," Apr. 25, 2003, 16 pages.

United States Patent and Trademark Office, "Supplemental Notice of Allowance," issued in connection with U.S. Appl. No. 11/788,129, mailed Nov. 7, 2012, 7 pages.

United States Patent and Trademark Office, "Notice of Allowance," issued in connection with U.S. Appl. No. 11/788,129, mailed Aug. 16, 2012, 28 pages.

United States Patent and Trademark Office, "Non-Final Office Action," issued in connection with U.S. Appl. No. 11/788,129, mailed Dec. 6, 2011, 23 pages.

* cited by examiner

| | 302 — Acct. # | 304 — Password | 306 — War Dialing Profile | 308 — Scheduled Audit Time |
|---|---|---|---|---|
| | 4142825176 | ****** | Profile A ⬇ | HH 02 MM 30 |

300 ↙

Repeat:
- ☐ Once only
- ☐ Daily
- ☑ Weekly
- ☐ Monthly
- ☐ Never

| | 312 — EXCLUDE? | 310 — DESTINATION # | 314 — WHITELISTED? |
|---|---|---|---|
| 1 | ☐ | 555-547-5236 | ☒ |
| 2 | ☐ | 555-547-5237 | ☐ |
| 3 | ☐ | 555-547-5238 | ☒ |
| 4 | ☐ | 555-547-5239 | ☒ |
| 5 | ☐ | 555-547-5240 | ☐ |
| 6 | ☒ | 555-547-5241 | ☐ |
| 7 | ☐ | 555-547-5242 | ☐ |
| 8 | ☐ | 555-547-5243 | ☐ |
| 9 | ☐ | 555-547-5244 | ☐ |

Uncheck All / Check All

318 — ADD    316 — ###-###-####

320 — APPEND FROM FILE

DELETE # to #

322 — UPDATE    324 — NEW

| | 404 TIME/DATE | 402 DIALED NUMBER | 406 STATUS |
|---|---|---|---|
| 1 | 070424-13:59:37 | 555-547-5236 | No answer |
| 2 | 070424-13:59:37 | 555-547-5237 | Negotiation Tones |
| 3 | 070424-13:59:37 | 555-547-5238 | Negotiation Tones |
| 4 | 070424-13:59:37 | 555-547-5239 | Voicemail |
| 5 | 070424-13:59:38 | 555-547-5240 | Voicemail |
| 6 | 070424-13:59:38 | 555-547-5242 | No answer |
| 7 | 070424-13:59:38 | 555-547-5243 | No answer |
| 8 | 070424-13:59:38 | 555-547-5244 | Negotiation Tones |

| | 502 | 504 | 506 | 508 | 510 |
|---|---|---|---|---|---|
| | TIME/DATE | DIALED NUMBER | STATUS | LOCATION | ACTION TAKEN |
| 1 | 070424-13:59:37 | 555-547-5236 | No answer | Acoustic Lab | none |
| 2 | 070424-13:59:37 | 555-547-5237 | Neg. Tones | Optics Lab | Gateway blk. |

FIG. 5

| TIME/DATE | DESTINATION # | ORIGINATING #/IP |
|---|---|---|
| 070424-16:10:05 | 555-1111 *904* | 555-1212 |
| 070424-16:10:05 | 555-2555 *906* | 555-1213 |
| 070424-16:10:05 | 555-7121 *908* | 555-1214 |
| 070424-16:11:05 | 555-1112 *912* | 555-1212 |
| 070424-16:11:05 | 555-2556 *914* | 555-1213 |
| 070424-16:11:05 | 555-7122 *916* | 555-1214 |
| 070424-16:12:05 | 555-1113 *922* | 555-1212 |
| 070424-16:12:05 | 555-2557 *924* | 555-1213 |
| 070424-16:12:05 | 555-7123 *926* | 555-1214 |

FIG. 9

METHODS AND APPARATUS TO PROTECT AND AUDIT COMMUNICATION LINE STATUS

CROSS REFERENCE TO RELATED APPLICATION

This patent is a continuation of and claims priority to U.S. application Ser. No. 11/788,129, filed Apr. 19, 2007, entitled "Methods and Apparatus to Protect and Audit Communication Line Status," which is hereby incorporated herein by reference in its entirety.

FIELD OF THE DISCLOSURE

This disclosure relates generally to communication networks, and, more particularly, to methods and apparatus to protect and audit communication line status.

BACKGROUND

Communication networks for businesses or personal residences sometimes include network devices that have the potential to permit unwanted intrusions if not protected by security measures. These instructions may be in the form of unwanted faxes, computer generated audio surveys, computer generated audio advertisements, and/or direct connections to a data modem. Such network devices include fax machines that may be abused by telemarketers that transmit numerous unsolicited sales brochures and marketing surveys. The fax machines may be employed by an organization (e.g., a mid to large size business) as a stand-alone device, and/or as a personal computer (PC) configured with a modem to receive and/or transmit facsimile data. Further, PCs configured with one or more modems adapted to receive incoming data connections and/or facsimile data introduce a potential security risk to the network if such PCs are also communicatively connected to the company network via high speed data cables and/or internal wireless network(s). Residential and business customers may receive unwanted computer generated audio surveys or advertisements that may not pose a security risk, but are a nuisance to customers.

Mid to large size businesses sometimes allocate a bank of numerically consecutive telephone numbers (lines) dedicated to voice and/or fax machines in various locations throughout that business. For example, a block of one-thousand consecutive telephone numbers may be allocated to a workforce of a company department, while an additional block of fifty consecutive telephone numbers may be allocated to provide facsimile services for that workforce. Additionally, PCs allocated to each of the workforce members may include a modem as standard equipment of the PC that, if connected to a telephone line, introduces a potential manner of external access to that PC.

As a business adapts to changing market forces, various departments may experience significant change that results in workforce reallocation, turnover, and/or departmental reorganization. As a result, some of the allocated lines for the workforce members may be re-routed to alternate company locations, left unutilized due to workforce turnover, or forgotten altogether. While some organizations may track the utilization of allocated lines and the resources such lines support, the task of tracking numerous lines is labor intensive and tedious. Even when the original block of, for example, one-thousand lines is known, determining where each line is connected, if connected at all, may involve a significant amount of manual tracking efforts.

BRIEF DESCRIPTION OF THE DRAWINGS

FIG. 3 is an example view of a portion of an example GUI configuration screen of the system of FIG. 1.

FIG. 4 is an example view of a portion of a dialing log of the example audit dialing manager of FIGS. 1 and 2.

FIG. 5 is an example view of a portion of a status report generated by the example audit dialing manager of FIGS. 1 and 2.

FIGS. 8 and 9 are example views of portions of log files recording activities indicative of a war dialer generated by the example audit dialing manager of FIGS. 1 and 2.

DETAILED DESCRIPTION

Methods and apparatus to protect and audit communication line status are disclosed. An example method includes receiving a set of available communication lines from a media gateway, associating a plurality of destination numbers with respective ones of the available communication lines, and dialing the plurality of destination numbers from the media gateway to identify the communication line status information.

To identify whether the lines are utilized and/or what resources the line(s) are supporting (e.g., a fax machine, a PC modem, a telephone, etc.), an audit application may be employed by the organization. The audit application includes simultaneously calling numerically consecutive blocks of destination telephone numbers, typically from several originating telephone lines, with the objective of determining what device(s) are connected to that line. The audit application may include simultaneously calling a block of numbers, sequentially calling numerically consecutive numbers, and/or sequentially calling blocks of numbers. Those lines that answer with handshaking tones from a network device (e.g., fax handshaking tones, modem handshaking tones, etc.) may be identified so that the organization can follow-up with the responsive device and ensure that adequate security procedures are employed.

The audit application may be performed by a PC configured with (1) multiple modems, each of which is controlled by the PC, and (2) an audit application that dials telephone numbers. Each of the modems is connected to a dedicated line that is typically owned or leased by the organization for the purpose of performing an audit of their telephone line inventory. However, the PC has a limited number of modems that it can control simultaneously by virtue of available hardware ports (e.g., PCI slots, USB ports, etc.) and/or the limited processing power of the PC to simultaneously control multiple modems. As an example, if a PC includes four (4) modems, 240 lines may be audited each hour. If an organization has 10,000 lines, over 41 hours would be required to complete the audit.

Figure 1:
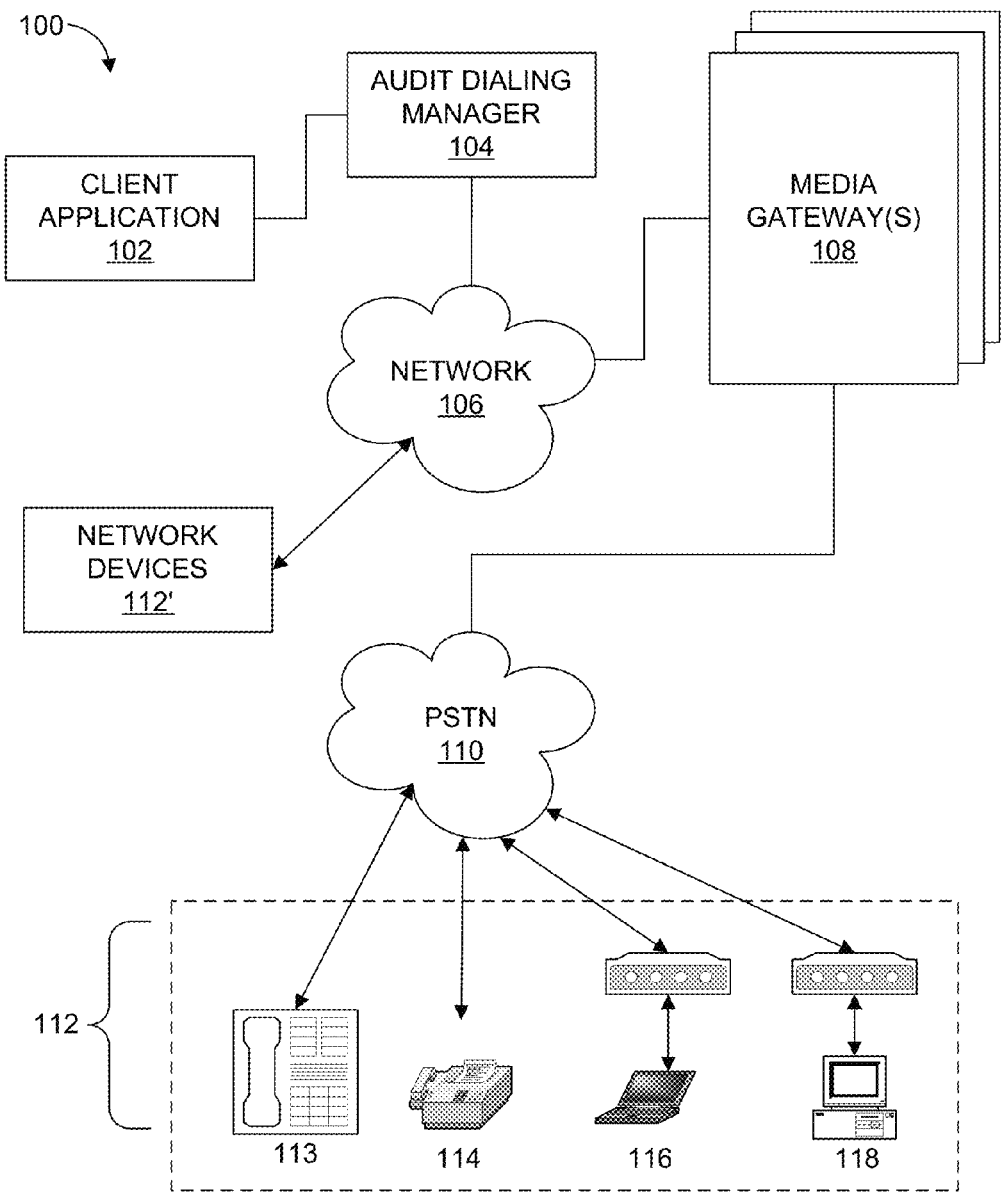
FIG. 1 is a schematic illustration of an example system to audit communication line status.

An example system 100 to audit communication line status is shown in FIG. 1. In the illustrated example of FIG. 1, the system 100 includes a client application 102 to allow a client (e.g., an organization) to invoke auditing services of one or more lines, an audit dialing manager 104 to control the audit dialing audit process, a network 106 (e.g., an intranet, the Internet, Voice over IP network (VoIP), etc.) to facilitate communication between the components of the system 100, and a media gateway 108 communicatively connected to the network 106 and one or more public switched telephone networks (PSTNs) 110. The client application 102 and the audit dialing manager 104 are shown as separate items for ease of illustration, but persons having ordinary skill in the art will appreciate that the client application 102 may be an integral part of the audit dialing manager 104. Similarly, the audit dialing manager 104 may be communicatively connected directly to the media gateway 108 and/or the client application 102 may be communicatively connected directly to the audit dialing manager 104.

The example PSTN 110 is connected to one or more network devices 112, which may include, but are not limited to, a telephone 113, a fax machine 114, a laptop 116, and/or a desktop personal computer (PC) 118. Each of the network devices 112 may have a corresponding telephone number that was assigned, for example, by an organization (e.g., a company, an office, etc.) to facilitate telephone, facsimile, and/or modem communication capabilities. While only four example network devices 112 are shown in FIG. 1, persons having ordinary skill in the art will appreciate that an organization may own and/or lease thousands of lines to facilitate network communication services. Similarly, such network devices 112' may be communicatively connected to the network 106, thereby facilitating protection and/or auditing of communication lines in a VoIP environment. Such lines may have been purchased and/or leased in blocks of consecutive numbers. Audit procedures are particularly valuable to the organization because, for example, some of the network devices 112 may be communicatively connected to one or more internal networks of the organization, such as a private network and/or an intranet. As a result, a malicious third party may gain access the private network via the telephone line if such line(s) are not adequately protected. Adequate network device protection may include, but is not limited to, password protection of the laptop 116 and/or PC 118, and/or firewall protection of the laptop 116 and/or PC 118.

As discussed in further detail below, a member of the organization (e.g., a network administrator) may invoke the audit dialing manager 104 via the client application 102. The client application 102 may be employed as a web page communicatively available to the client via the network 106 (e.g., an Internet connection) so that, after providing authorization credentials (e.g., a username and associated password), the client can initiate, halt, and/or edit audit dialing procedures of one or more network devices 112. Additionally or alternatively, the client application 102 may be employed as an application programming interface (API) that executes on a client's (e.g., the network administrator) PC. The API may include a graphical user interface (GUI) and one or more software calls to invoke the functionality of the audit dialing manager 104.

In the illustrated example of FIG. 1, the audit dialing manager 104 receives one or more instructions and/or commands from the client application 102 and invokes the media gateway 108 to obtain one or more available lines to begin an audit of the organization's lines. The example media gateway 108 operates between various networks and changes streams of traditional time division multiplexed (TDM) PSTN signals to one or more single streams of internet protocol (IP) streams, and vice-versa. The example media gateway 108 may also switch/route voice and data traffic from IP network to IP network and PSTN network to PSTN network. Persons having ordinary skill in the art will appreciate that the media gateway 108 executes a media gateway control protocol (MGCP), a session initiated protocol (SIP), Megaco, and/or any other protocol that, among other things, enables external control and management of data communications equipment (e.g., the media gateway 108). While an audit dialing application that executes from a single PC may only simultaneously control a relatively small number of modems, the media gateway 108 may be simultaneously communicatively connected to thousands of analog lines. As a result, the organization may avoid the need to buy and/or lease additional analog lines for the purpose of auditing their internal lines via a PC-based audit application.

Instead, the audit dialing manager 104 may communicate with any available media gateways 108 to identify available communication lines (e.g., telephone lines, analog trunk lines that are not currently being used for communication, etc.) and dial one of several telephone numbers owned and/or leased by the organization in an effort to determine the type of network device 112 that is currently connected thereto. Rather than require a PC to directly control a relatively small number of hardware modems for audit dialing efforts, the example client application 102 and/or the example audit dialing manager 104 allows emulation of a plurality of PSTN modems for audit dialing. Additionally, because idle communication lines on the media gateway 108 do not cost the service provider any money, the services of auditing network devices described herein may be provided to the client for a lower cost than would be required by a traditional war dialing approach. Audit dialing services may be provided to a client (e.g., an organization) for a fee, in which one or more audits may be performed on the client's network one or more times upon request, periodically, and/or at scheduled intervals. However, the traditional war dialing approach would typically require the client to buy and/or lease several communication lines (e.g., telephone lines) and control a modem connected to each leased communication line. The audit dialing manager 104 may invoke the media gateway 108 during relatively low-traffic time periods (e.g., 12:00 AM to 4:00 AM) to dial one or more sequences of telephone numbers owned, leased, and/or managed by the organization. As described in further detail below, log files generated and saved by the media gateway 108 in response to the audit dialing are received by the audit dialing manager 104 and formatted as an output report for the client (e.g., the organization's network administrator).

Figure 2:
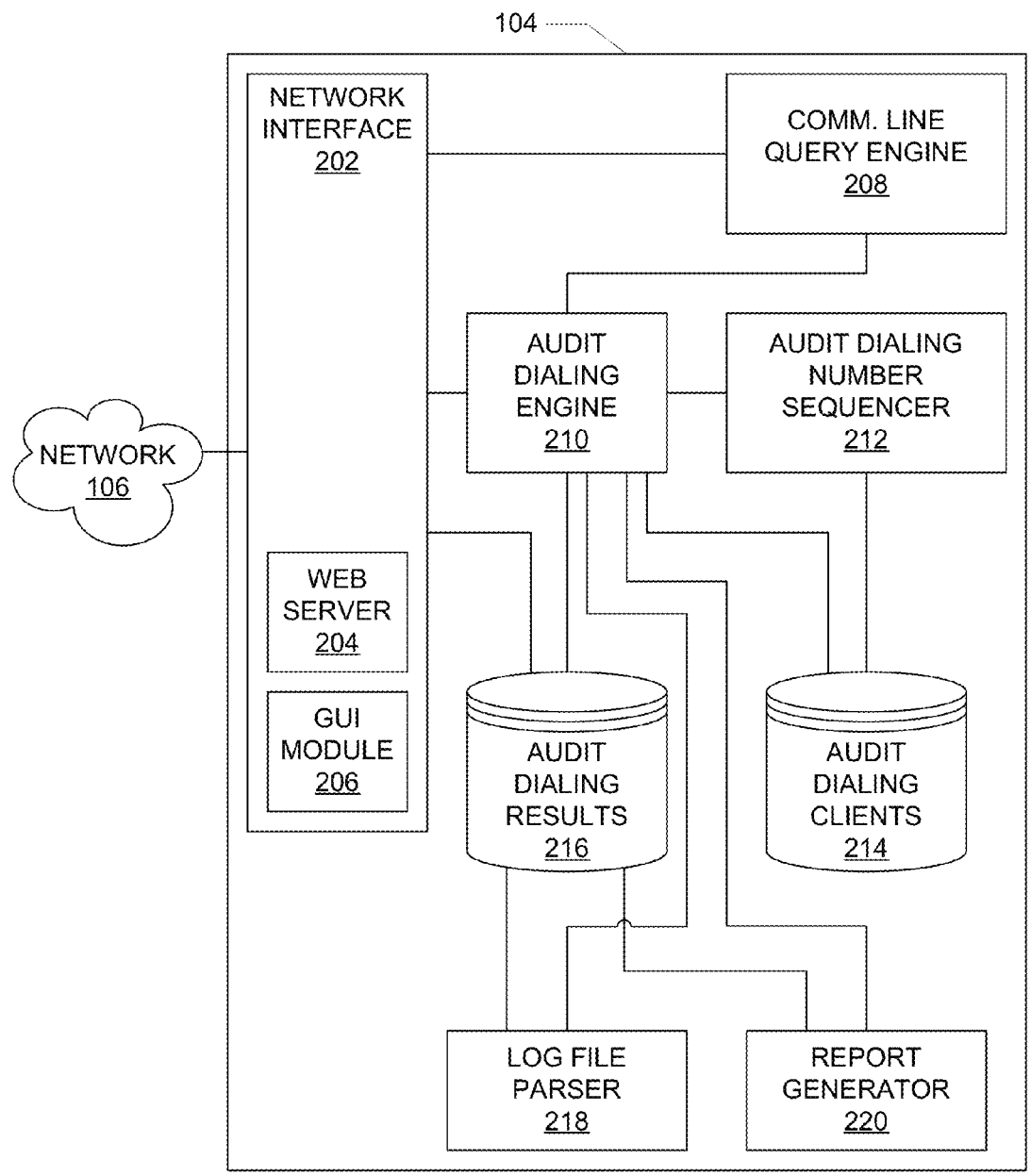
FIG. 2 is a more detailed illustration of the example audit dialing manager of FIG. 1.

An example audit dialing manager 104 is shown in FIG. 2. The example audit dialing manager 104 of FIG. 2 includes a network interface 202, a web server 204, and a graphical user interface module 206. In the illustrated example, the network interface 202 is communicatively connected to the network 106 and, without limitation, may be directly connected to the client application 102 and/or the media gateway 108. The example audit dialing manager 104 of FIG. 2 also includes a communication line query engine 208, an audit dialing engine 210, and an audit dialing number sequencer 212. The example audit dialing number sequencer 212 is communicatively connected to an audit dialing client database 214. The example audit dialing engine 210 is communicatively connected to an audit dialing results database 216. A log file parser 218 may be invoked by the audit dialing engine 210 to extract log files from the audit dialing results database 216 and to determine what type(s) of network device(s) 112, if any, are associated with a dialed telephone number. As discussed in further detail below, the example log file parser 218 of FIG. 2 also includes a pattern-trap to detect war dialing behavior by potentially malicious parties. Unlike audit dialing, war dialing includes one or more attempts by a third party to dial destination telephone numbers in an attempt to discover people and/or devices associated with the destination number. The war dialer may be a telemarketer searching for voice lines and/or fax machines to which unsolicited advertisements may be sent. Additionally, the war dialer may be searching for PC modems, which may result in unauthorized attempts to access the PC, PC resources, and/or one or more networks connected to the PC. The example audit dialing manager 104 also includes a report generator 220 to format results from the log file parser and present the client with a status report of one or more audits of their leased, owned, and/or managed telephone lines.

In the illustrated example of FIG. 2, the client (e.g., the network administrator using the client application 102) accesses the audit dialing manager 104, and/or one or more services of the audit dialing engine 210, the communication line query engine 208, the audit dialing number sequencer 212, the audit dialing results database 216, the audit dialing client database 218, the log file parser 218, and/or the report generator 220 via the network interface 202. Client interaction and/or access to the audit dialing manager 104 may be accomplished via one or more of the Internet, an intranet, a computer, a workstation, a kiosk, etc. The network interface 202 of the illustrated example enables communication via web-pages using the web server 204 and/or via a graphical and/or command-line user interface using one or more GUIs generated by the GUI module 206.

In the illustrated example of FIG. 2, a user (e.g., the client/system administrator of the organization) of the example system 100 accesses the GUI module 206 or the web server 204 and enters authentication credentials before gaining access to the services of the audit dialing manager 104. Upon successful authentication (e.g., via successfully entering a correct username and associated password), the user is permitted to create an audit dialing profile, select a pre-existing audit dialing profile, and/or edit the pre-existing audit dialing profile. The audit dialing profile may include a list of sequential and/or non-sequential telephone numbers owned, leased, and/or otherwise managed by the organization. Operation of the audit procedure(s) may be configured to occur during a period of time when the PSTN 110 does not usually handle a large amount of traffic, such as the early morning hours. Persons having ordinary skill in the art will appreciate that a fee for auditing procedures that include audit dialing efforts of the media gateway 108 may be less expensive during the early morning hours when demand for many communication lines (e.g., analog trunk lines, telephone lines, etc.) is typically much lower than, for example, early afternoon hours of a regular work week when such demand may be high.

The example communication line query engine 208 identifies one or more sets of lines of the PSTN 110 and determines which of those lines are available. For example, the communication line query engine 208 may send one or more commands to the media gateway 108 to identify unutilized trunk access numbers within one or more trunk groups. Persons having ordinary skill in the art will appreciate that such efforts to locate an available trunk line are referred to as trunk-hunting and/or trunk-monitoring. The PSTN 110 may cover a vast geographic area that is sub-divided into various categories/regions for ease of reference (e.g., downtown PSTN sub-network, Northwest suburb PSTN sub-network, Southwest suburb PSTN sub-network, etc.). The one or more lines of the sub-network deemed available (e.g., not currently being used for communication) are temporarily reserved by the audit dialing engine 210 via control signal(s) to the media gateway 108 while the audit dialing number sequencer 212 associates the available line with the client's telephone number(s). Association of the available line(s) with the client's telephone number(s) may include retrieving the list of client telephone numbers from the audit dialing client database 214. The database 214 may be sub-divided into one or more portions, in which each portion is dedicated to one client. The number sequencer 212 retrieves each of the available client telephone numbers from the database 214 and associates each number with an available line. Upon associating all of the client's telephone numbers with an available line, the audit dialing engine instructs the media gateway 108 to dial each one of the client's telephone numbers and record a log of activity, as discussed in further detail below.

FIG. 3 illustrates an example GUI 300 displayed by the GUI module 206 and/or displayed as a web page via the example web server 204. The example GUI 300 is available to the client using the client application 102 and includes an account number field 302 and a password field 304 to allow the client to enter authentication credentials before invoking the services of the example system 100. In response to receiving proper authentication credentials, the example GUI module 206 receives data corresponding to the client account number 302 from the audit dialing client database 214 and populates the GUI 300. For example, the GUI 300 includes a profile drop down menu 306, a scheduled audit time 308, and a destination number column 310. Each destination number in the destination number column 310 includes an associated exclude indicator, as shown in an exclude column 312, and an associated whitelist indicator, as shown in a whitelist column 314.

In the illustrated example of FIG. 3, only nine destination numbers are listed in the destination number column 310, but persons having ordinary skill in the art will appreciate that the destination number column 310 may include hundreds or thousands of destination numbers the client wishes to audit. Destination numbers that include a check in the exclude column 312 are flagged as numbers not in need of an audit. For example, the destination number 555-547-5241 (row 6) includes a check in the exclude column 312 to prevent the audit dialing engine from instructing the media gateway 108 to dial that number in search of an associated network device. Such exclusionary options may be particularly useful when the organization knows of particular destination numbers having an established association, thereby precluding a need to perform the audit.

On the other hand, the organization may still choose to audit a destination number despite knowledge of one or more network devices connected thereto. For example, the client may know that the destination number 555-547-5238 (row 3) is associated with an employee having a modem installed in a PC, for which the employee is authorized to use for business purposes. An audit of that destination number may still occur to confirm such connectivity, but the check-mark in the whitelist column 314 instructs the media gateway not to block and/or otherwise tie-up the line if modem negotiation tones are detected.

Still further, the client may know that the destination number 555-547-5237 (row 2) is associated with an employee that is authorized to utilize the line only for telephonic purposes. However, due to the prolific presence of internal modems on desktop computers, the organization may be at risk if the employee also connects the line to the modem. In such an example case, the absence of a check-mark in the whitelist column 314 instructs the media gateway 108 to block any communication attempt to the destination number 555-547-5237 if negotiation tones are detected during the audit. To that end, the example media gateway 108 may block the call or redirect the caller so that they hear a message stating that calls to the dialed number are being denied, and/or instruct the caller to contact an alternate number for assistance.

Additional telephone numbers may be added with a blank destination number field 316 and an add button 318, and/or the user may be allowed to add multiple destination numbers from a file via an append-from-file button 320. Persons having ordinary skill in the art will appreciate that data files containing lists of destination numbers may be saved in files of any type, such as comma separated value (CSV) files, space delimited files, binary files, and/or any other file format that may be parsed for one or more destination numbers. Changes made to the selected profile may be updated via the update button 322, which saves the profile to the audit dialing client database 214. Alternatively, changes made to the example GUI 300 may be saved as a new profile via the new profile button 324.

As discussed above, the audit dialing number sequencer 212 accesses the audit dialing client database 214, which stores the data from the example GUI 300, and associates each of the destination numbers from the destination column 310 with an available communication line. Destination numbers having a corresponding check-mark in the exclude column 312, such as row 6, are not included in the audit, while destination numbers having a corresponding check-mark in the whitelist column 314 are not blocked by the media gateway 108 if negotiation tones are detected. FIG. 4 illustrates an example audit dialing log 400 saved by the media gateway 108 and stored on the audit dialing results database 216. In the illustrated example of FIG. 4, each dialed number (as directed by the client's configured profile) is shown in a dialed number column 402. The example dialing log 400 also includes a time/date stamp column 404 and a status column 406. The time/date stamp column 404 includes a date and time at which the corresponding dialed number was accessed, and the status column 406 indicates what result occurred after each number was dialed. In example row 1 of FIG. 4, the number 555-547-5236 was dialed at 1:59:37 AM on Apr. 24, 2007 and no response was detected by the media gateway 108. On the other hand, example row 2 of FIG. 4 illustrates that the number 555-547-5237 was also dialed at that same time and negotiation tones were detected by the media gateway 108. Briefly returning to FIG. 3, because the profile does not include a corresponding check-mark for the number 555-547-5237, the media gateway 108 will block further communication attempts by outside parties when such attempts are routed and/or switched through the media gateway 108. However, persons having ordinary skill in the art will appreciate that the example audit dialing engine 210 may send a list of one or more blocked numbers (e.g., from the audit dialing client database 214) to an intelligent peripheral/service node (IP/SN), a service switching point (SSP), a signal transfer point (STP), and/or a signal control point (SCP). To that end, identified numbers may be blocked even if not routed and/or switched by the example media gateway. As discussed in further detail below, the client may be provided with a status report detailing such activity so that preventative and/or corrective measures may be taken by the network administrator and/or the employee associated with the blocked number may be notified of the block.

The log file parser 218 extracts entries from the example audit dialing log 400 that are deemed suspect. Of the nine numbers listed in the example GUI 300, only eight were dialed by the media gateway 108 due to the check-mark of row 6 for the exclude column 312. Of the eight numbers dialed by the media gateway 108, only two resulted in behavior that may be deemed suspect, which corresponds to the numbers 555-547-5236 and 555-547-5237. The example log file parser 218 identified 555-547-5236 as suspect because no negotiation tones or voicemail was detected even though that destination number includes a check-box in the whitelist column 314. Persons having ordinary skill in the art will appreciate that this may be due to organizational policies to turn off computers in the evening for energy conservation purposes. Nonetheless, the log file parser 218 extracts this destination number as a potential issue to allow the client to make an independent assessment, if desired. Additionally, the example log file parser 218 identified 555-547-5237 as suspect because negotiation tones were detected, thereby indicating possible improper usage of the line and/or a potential security threat to the organization.

FIG. 5 illustrates an example status report 500 generated by the report generator 220. In the example of FIG. 5, the status report 500 includes a date/time column 502, a dialed number column 504, a status column 506, a location column 508, and an action taken column 510. The log file parser 218 identified two destination numbers that may be interpreted by the client as suspect, and listed each number in rows 1 and 2. The example status report 500 informs the client, among other things, that the destination number 555-547-5237 has been blocked by the media gateway 108, thereby allowing the network administrator to perform any appropriate security measures to the network device(s) associated with the number 555-547-5237.

Figure 6:
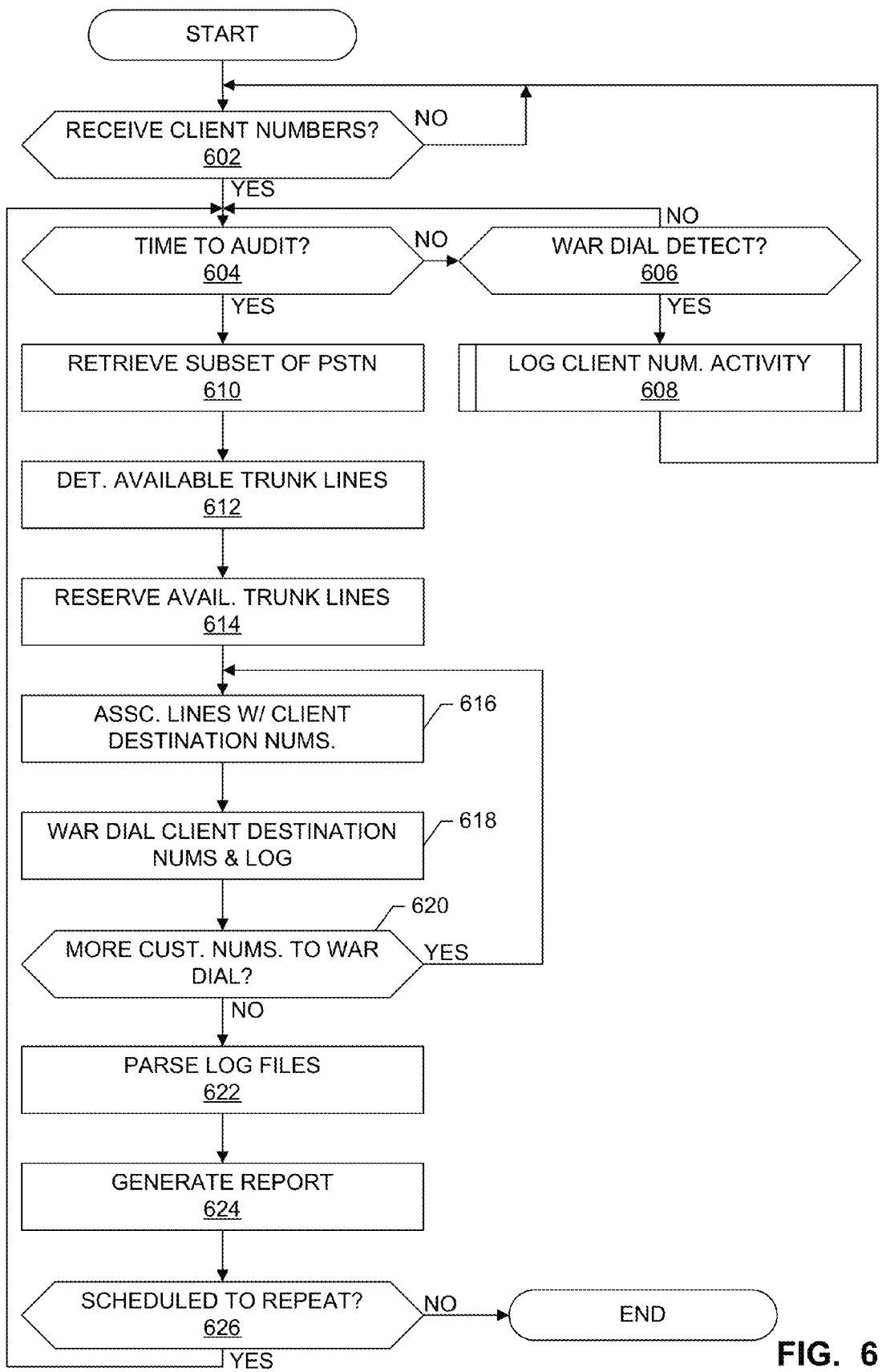
FIGS. 6 and 7 are flow diagrams representative of example machine readable instructions which may be executed to implement the example system of FIGS. 1 and 2.
Figure 7:
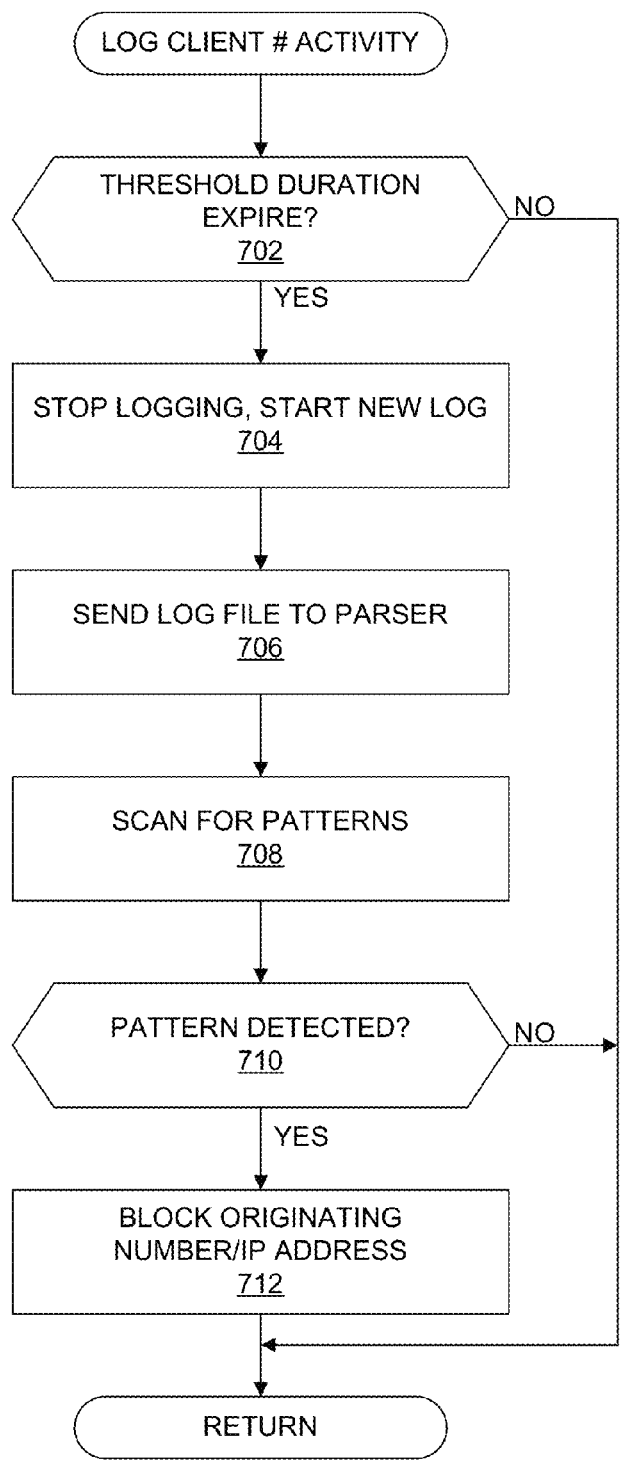

Flowcharts representative of example machine readable instructions for implementing methods and apparatus of FIGS. 1-5 are shown in FIGS. 6 and 7. In these examples, the machine readable instructions comprise programs for execution by: (a) a processor such as the processor 1010 shown in FIG. 10, which may be part of a computer, (b) a controller, and/or (c) any other suitable processing device. The programs may be embodied in software stored on a tangible medium such as, for example, a flash memory, a CD-ROM, a floppy disk, a hard drive, a digital versatile disk (DVD), or a memory associated with the processor 1010, but persons of ordinary skill in the art will readily appreciate that the entire programs and/or parts thereof could alternatively be executed by a device other than the processor 1010 and/or embodied in firmware or dedicated hardware in a well known manner. For example, any or all of the example client application 102, the audit dialing manager 104, the network interface 202, the web server 204, the GUI module 206, the communication line query engine 208, the audit dialing engine 210, the audit dialing number sequencer 212, the log file parser 218, and/or the report generator 220 could be implemented by software, hardware, and/or firmware (e.g., it may be implemented by an application specific integrated circuit (ASIC), a programmable logic device (PLD), a field programmable logic device (FPLD), discrete logic, etc.).

Also, some or all of the machine readable instructions represented by the flowcharts of FIGS. 6 and 7 may be implemented manually. Further, although the example programs are described with reference to the flowcharts illustrated in FIGS. 6 and 7, persons of ordinary skill in the art will readily appreciate that many other methods of implementing the example machine readable instructions may alternatively be used. For example, the order of execution of the blocks may be changed, and/or some of the blocks described may be changed, substituted, eliminated, or combined.

The example process 600 of FIG. 6 begins at block 602 where the audit dialing client database 214 receives one or more numbers from the client. As described above, the client may enter one or more destination numbers via the example GUI 300 as shown in FIG. 3 and/or provide such numbers as a file (e.g., a CSV file, a space delimited file, a text file, etc.). The example audit dialing engine 210 determines if an audit process should begin (block 604) by referring to the scheduled audit time 308. Briefly referring to FIG. 3, the client may configure the system via the example GUI 300 to perform an audit each week at 2:30 AM. Persons having ordinary skill in the art will appreciate that such early morning times typically include substantially lower call volume, thereby allowing more available trunk lines to be assigned by the media gateway 108. As the number of available trunk lines increases, the amount of time required to audit client destination numbers decreases.

If the audit dialing engine 210 determines that it is not time to perform the audit (block 604), then the audit dialing engine 210 determines whether the client has elected to detect an occurrence of war dialing attempts on its own network (block 606). War dialing detection may be employed using methods and/or apparatus as described in U.S. patent application Ser. No. 11/250,713, filed on Oct. 13, 2005, and entitled "Methods and Apparatus to Detect and Block Unwanted Fax Calls." U.S. patent application Ser. No. 11/250,713 is hereby incorporated by reference in its entirety.

If the client has not elected to detect for the occurrence of war dialing (block 606), then control returns to block 604 to wait for the audit start time. On the other hand, if the client has elected to monitor for the presence of war dialing efforts within and/or toward telephone numbers associated with its own network (block 606), then the audit dialing engine 210 invokes the media gateway 108 to begin storing a log of activity associated with the client's telephone numbers (block 608). As discussed in further detail below, the system 100 for auditing network devices may extract one or more log files from the media gateway 108 and search for war dialing patterns.

When the audit dialing engine 210 determines that the audit should begin (e.g., the weekly time period has elapsed) (block 604), then the audit dialing engine 210 invokes the services of the trunk line query engine 208 to determine and reserve available trunk lines (block 610). Generally speaking, the media gateway 108 may be communicatively connected to thousands of PSTN communication lines (e.g., trunk lines), but some or all of those communication lines may be in-use for communication purposes at any given time. Communication line utilization fluctuates at various times of the day in which some communication lines facilitate telephone communication, analog modem communication, fax transmission (s), home-security systems, etc. The example communication line query engine 208 accesses the media gateway 108 via the network interface 202 and sends one or more command signals to request one or more available communication lines (block 612). Based in part on how many destination numbers the client wishes to audit, the example communication line query engine 208 reserves a subset of available communication lines (block 614) to be used for audit dialing of the destination numbers. For example, if the media gateway 108 has one thousand available trunk lines and the client has ten thousand destination numbers to audit, then assuming it takes one minute per number to audit each destination number, all ten thousand destination numbers may be audited within ten minutes. In contrast to the speed at which the media gateway may audit destination numbers, a standard PC controlling four trunk lines would require over forty one hours to audit those ten thousand destination numbers of the example organization again, assuming it takes one minute per number to audit each destination number.

The available trunk lines are then associated with some of the client destination numbers (block 616). For example, the client may have many more destination numbers to audit than are available by the media gateway 108 at any given time. Accordingly, the audit dialing number sequencer 212 may associate client destination numbers with available communication lines in batches. Each of the client destination numbers of a batch are dialed by the media gateway 108 and a log of such activity is saved by the media gateway 108 (block 618). The example audit dialing number sequencer 212 determines if there are more client destination numbers to audit (block 620) and, if so, returns to block 616 to associate available communication lines with client destination numbers. Persons having ordinary skill in the art will appreciate that control could, alternatively, return to block 612 if the communication line query engine 208 had previously relinquished communication line reservation(s).

When the audit dialing manager 104 has completed audit dialing for all of the client destination numbers (block 620), the log files saved by the media gateway 108 are sent to the audit dialing results database 216 and are parsed by the log file parser 218 (block 622). As described above, the example log file parser 218 reviews each log file for anomalies that may constitute an error and/or potential security breach such as, but not limited to, detecting negotiation tones on a destination number designated as voice-only, or failing to detect negotiation tones on a destination number designated as a fax machine. A report of anomalies and/or suspect behavior, if any, is then generated by the report generator 220 (block 624) and made available to the client for review. The example audit dialing manager 104 may provide the client with the report via e-mail and/or an Internet/intranet accessible web page. The example audit dialing engine 210 determines if the audit process is scheduled to repeat (block 626) by accessing GUI 300 settings stored in the audit dialing client database 214. For example, the client may schedule the list of client destination numbers to be audited on a daily, weekly, and/or monthly basis. If so, control returns to block 604 to monitor for the next audit time.

FIG. 7 illustrates additional detail of the example process 608 to log in-bound and/or out-bound dialing activity of the client's destination numbers. Generally speaking, the example process 608 of FIG. 7 employs the example media gateway 108 to detect the occurrence of an outside third party utilizing war dialing techniques in an effort to identify network weaknesses (e.g., a modem connected to a networked PC) and/or identify available fax lines to which unsolicited fax marketing may be sent. The audit dialing engine 210 instructs the media gateway 108 to append call activity of the client destination numbers for a threshold duration (e.g., a log of activity for one day, for one week, for one month, etc.). If the threshold duration expires (block 702), the audit dialing engine 210 instructs the media gateway 108 to stop appending to the log file and to start a separate log file (block 704). For example, the client may receive a weekly report of war dialing attacks on its destination numbers by beginning another weekly log immediately after the current log completes its weekly collection. The media gateway 108 sends the completed log file to the log file parser 218 (block 706) and the log file parser 218 scans for patterns indicative of war dialing (block 708).

If the log file parser 218 does not detect any patterns indicative of war dialing (block 710), then control returns to block 602 (see FIG. 6). However, if the log file parser 218 detects patterns indicative of war dialing (block 710), then the originating numbers responsible for war dialing may be identified and blocked by the media gateway 108. As such, any future attempts by the suspected war dialing originating number are blocked when attempting to dial any of the client destination numbers. Persons having ordinary skill in the art will appreciate that, because the example media gateway 108 changes streams of TDM signals to IP signals, and vice-versa, the IP address of a war dialer may be identified. To that end, the audit dialing engine 210 may instruct the media gateway 108 to prohibit any access to the client destination numbers if the originating IP address is associated with war dialing behavior. Additionally, the methods and apparatus described herein may audit destination numbers associated with networks employing voice-over-Internet protocol (VoIP) devices.

Figure 8:
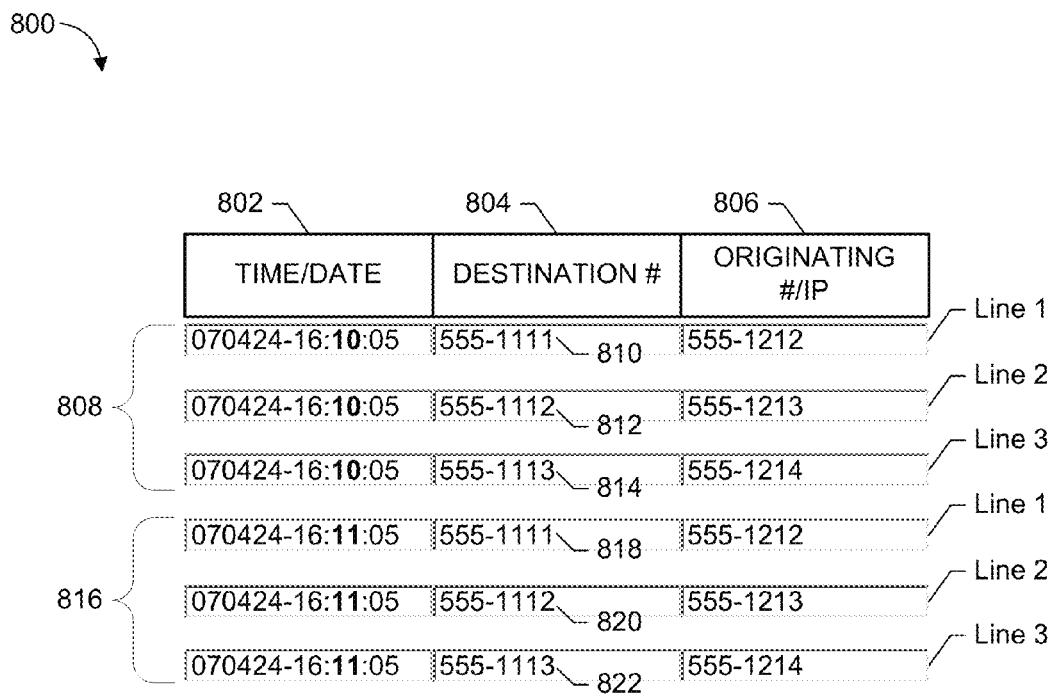

FIGS. 8 and 9 illustrate portions of example log files that may be analyzed by the log file parser 218 to detect war dialers. Referring first to FIG. 8, an example log file 800 includes a time/date column 802, a destination number column 804 (i.e., the number dialed by the war dialer), and an originating number column 806 (i.e., the number and/or IP address of the war dialer). Some war dialers may originate their war dialing techniques by using several originating lines, such as line 1 (originating number 555-1212), line 2 (originating number 555-1213), and line 3 (originating number 555-1214). Each of these lines may be a standard telephone line or originating IP address having a fax machine, or similar fax transmission device connected thereto. While a numerically consecutive block of telephone lines is sometimes assigned by a telephone company to a residence or business, a war dialer may also employ several lines having non-consecutive and/or arbitrary originating numbers. In the illustrated example log 800 of FIG. 8, the suspected war dialer calls, at a first time period 808 (e.g., Apr. 24, 2007 at 4:10:05 PM), destination numbers 555-1111 (810), 555-1112 (812), and 555-1113 (814). If any of the destination numbers happen to be a PC modem or fax machine, the war dialer knows that it may have access to the organization's internal network and/or the destination number may be sold to a fax-marketing company. The war dialer may repeat this process at a second time period 816 (e.g., Apr. 24, 2007 at 4:11:05 PM) and dial a new group of numerically consecutive destination numbers (e.g., 555-1114 (818), 555-1115 (820), and 555-1116 (822)).

In the illustrated example log file 800 of FIG. 8, the log file parser 218 detects patterns of consecutive behavior. For example, the log file parser 218 may detect the consecutive sequence of destination numbers (810, 812, 814, 818, 820, 822) and/or the frequency at which originating lines 1, 2, and 3 are employed within a relatively short period of time. If one or more of originating lines 1, 2, and/or 3 are deemed to be suspected war dialers, the audit dialing engine 210 may transmit a control signal to the media gateway 108 to block any attempts by such originating lines when calling a number within the client's list of destination numbers.

FIG. 9 illustrates an alternate war dialing technique employed by a war dialer who may be aware of pattern detection techniques employed to thwart detection efforts. Similar to FIG. 8, FIG. 9 illustrates a war dialer with several originating lines, such as lines 1, 2, and 3 (having originating numbers 555-1212, 555-1213, and 555-1214, respectively). At a first time period 902, the originating lines 1, 2, and 3 may simultaneously call destination numbers 555-1111 (904), 555-2555 (906), and 555-7121 (908). However, because each of the destination numbers dialed at the first time period 902 are not numerically consecutive, pattern detection techniques may not immediately determine that the originating lines 1, 2, and/or 3 are associated with a war dialer. On the other hand, at a second time period 910, the originating lines 1, 2, and 3 of the illustrated example of FIG. 9 call destination numbers 555-1112 (912), 555-2556 (914), and 555-7122 (916). An analysis by the log file parser 218 between the first time period 902 and the second time period 910 now reveals an emerging pattern of a numerically consecutive calling behavior for each of originating lines 1, 2, and 3.

The log file parser 218 may deem each of the originating lines 1, 2, and 3 as potential war dialers when a suspected threshold 918 (in this example, two) of numerically consecutive calls is observed. Employing the suspected threshold 918 accommodates for circumstances in which a caller accidentally misdials a number by one digit. Rather than immediately request that the media gateway 108 block all future attempts by the originating number from accessing the client's destination numbers in light of an innocent mistake, the originating number is merely flagged as "suspected" by the log file parser 218. However, as shown at a third time period 920, each of originating lines 1, 2, and 3 respectively place calls to destination numbers 555-1113 (922), 555-2557 (924), and 555-7123 (926). As each of these three destination numbers is numerically consecutive from the previous call placed by the corresponding originating numbers at the second time period 910 and the first time period 902, the log file parser 218 deems the originating numbers as war dialers. As a result, the audit dialing engine 210 sends a command instruction to the media gateway 108 to prevent any further access to the client destination numbers by these identified originating numbers.

Although the above example illustrates a suspected threshold 918 set at two numerically consecutive calls, persons having ordinary skill in the art will appreciate that the threshold may be set at any desired number of calls. Further, the example log file parser 218 may employ a confirmed threshold 928 of three consecutive calls before flagging the originating lines as war dialers. However, persons having ordinary skill in the art will appreciate that the confirmed threshold 928 could be placed several time periods away from the suspected threshold 918. For example, the confirmed threshold 928 may alternatively be set such that if the suspected war dialer associated with originating line 1 places an additional call to the client destination number 555-1113 at any time within a predetermined time period (e.g., 2 hours, 2 days, 2 weeks, etc.), originating line 1 will be deemed/confirmed a war dialer for future blocking by the media gateway 108.

Figure 10:
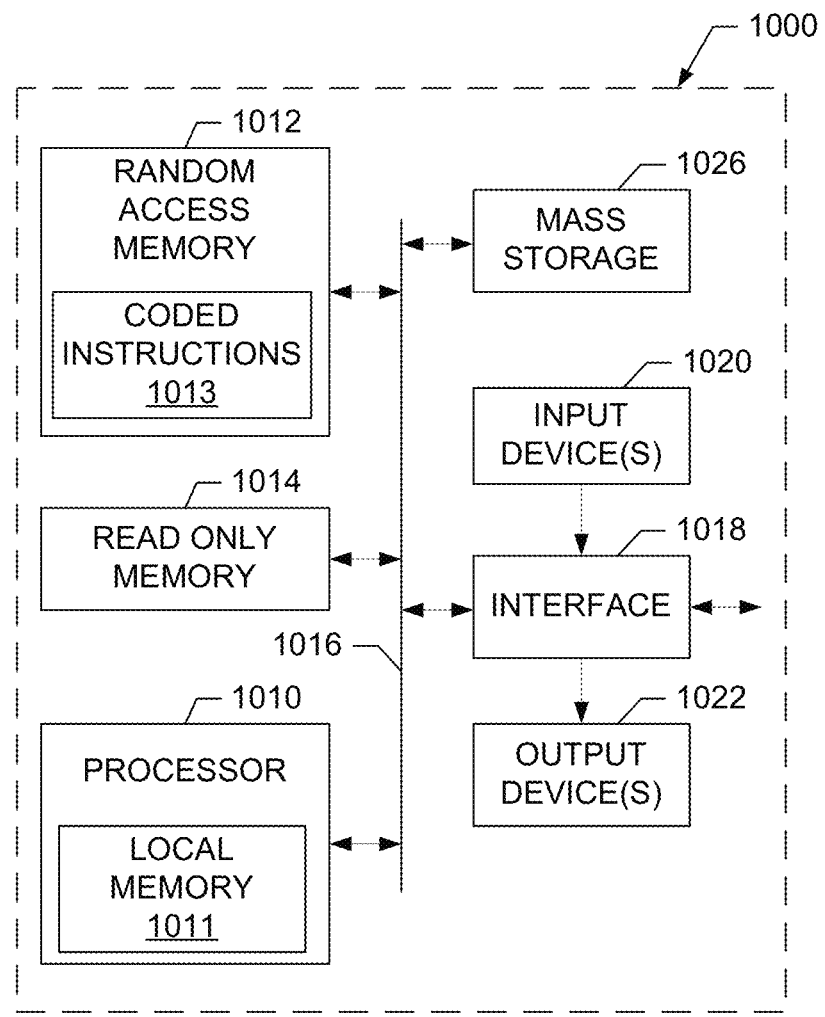
FIG. 10 is a schematic illustration of an example computer that may execute the example instructions of FIGS. 6 and 7 to implement the example system of FIGS. 1 and 2.

FIG. 10 is a block diagram of an example computer 1000 capable of executing the example machine recordable instructions represented by the flowcharts of FIGS. 6 and 7 to implement the apparatus and methods disclosed herein. The computer 1000 can be, for example, a server, a personal computer, a laptop, a PDA, or any other type of computing device.

The computer 1000 of the instant example includes a processor 1010 such as a general purpose programmable processor. The processor 1010 includes a local memory 1011, and executes coded instructions 1013 present in the local memory 1011 and/or in another memory device. The processor 1010 may execute, among other things, the example processes illustrated in FIGS. 6 and 7. The processor 1010 may be any type of processing unit, such as a microprocessor from the Intel® Centrino® family of microprocessors, the Intel® Pentium® family of microprocessors, the Intel® Itanium® family of microprocessors, the Intel XScale® family of processors, and/or the Motorola® family of processors. Of course, other processors from other families are also appropriate.

The processor 1010 is in communication with a main memory including a volatile memory 1012 and a non-volatile memory 1014 via a bus 1016. The volatile memory 1012 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1014 may be implemented by flash memory and/or any other desired type of memory device. Access to the main memory 1012, 1014 is typically controlled by a memory controller (not shown) in a conventional manner.

The computer 1000 also includes a conventional interface circuit 1018. The interface circuit 1018 may be implemented by any type of well known interface standard, such as an Ethernet interface, a universal serial bus (USB), and/or a third generation input/output (3GIO) interface.

One or more input devices 1020 are connected to the interface circuit 1018. The input device(s) 1020 permit a user to enter data and commands into the processor 1010. The input device(s) can be implemented by, for example, a keyboard, a mouse, a touchscreen, a track-pad, a trackball, isopoint and/or a voice recognition system.

One or more output devices 1022 are also connected to the interface circuit 1018. The output devices 1022 can be implemented, for example, by display devices (e.g., a liquid crystal display, a cathode ray tube display (CRT), a printer and/or speakers). The interface circuit 1018, thus, typically includes a graphics driver card.

The interface circuit 1018 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1000 also includes one or more mass storage devices 1026 for storing software and data. Examples of such mass storage devices 1026 include floppy disk drives, hard drive disks, compact disk drives and digital versatile disk (DVD) drives. The mass storage device 1026 may implement the memory of the example audit dialing results database 216, the audit dialing client database 214, and/or the example log file parser 218.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general purpose. Accordingly, replacement standards and protocols having the same general purpose are equivalents to the standards/protocols mentioned herein, and contemplated by this patent, are intended to be included within the scope of the accompanying claims.

This patent contemplates examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example software or firmware executed on hardware and/or stored in a memory, it should be noted that such software or firmware is merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods and articles of manufacture, persons of ordinary skill in the art will readily appreciate that the examples are not the only way to implement such methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to conditionally block a destination number, comprising:
    dialing the destination number via a media gateway;
    identifying a designated operation mode of the destination number as one of fax-only or voice-only;
    blocking the destination number when negotiation tones are detected and the destination number is designated as voice only; and
    blocking the destination number when negotiation tones are absent and the destination number is designated as fax-only.

2. A method as defined in claim 1, wherein dialing the destination number emulates an outbound modem connected to a set of communication lines communicatively connected to the media gateway.

3. A method as defined in claim 1, wherein identifying the designated operation mode comprises identifying at least one of a fax machine or a modem associated with the destination number.

4. A method as defined in claim 1, further comprising determining which of a plurality of communication lines is free of communication services.

5. A method as defined in claim 4, wherein the communication services comprise at least one of telephone traffic, facsimile traffic, or modem traffic.

6. A method as defined in claim 1, wherein the destination number is retrieved from a file comprising a plurality of destination numbers.

7. A method as defined in claim 6, further comprising parsing the plurality of destination numbers from the file.

8. A method as defined in claim 1, further comprising receiving a log file from the media gateway to identify network devices associated with a first plurality of destination numbers.

9. A method as defined in claim 8, further comprising blocking a second one of the first plurality of destination numbers associated with an unauthorized network device.

10. A method as defined in claim 1, wherein the media gateway at least one of converts a stream of time division multiplexed signals on a first network to an Internet protocol stream on a second network, or converts an Internet protocol stream on the second network to a stream of time division multiplexed signals on the first network.

11. An apparatus to conditionally block a destination number, comprising:
    a media gateway to dial the destination number;
    a communication line query engine to:
        identify a designated operation mode of the destination number as one of fax-only or voice-only;
        block the destination number when negotiation tones are detected and the destination number is designated as voice only; and
        block the destination number when negotiation tones are absent and the destination number is designated as fax only.

12. An apparatus as defined in claim 11, wherein the communication line query engine is to determine available communication lines connected to the media gateway.

13. An apparatus as defined in claim 11, further comprising a dialing number sequencer to associate the destination number with a media gateway communication line.

14. An apparatus as defined in claim 13, wherein the dialing number sequencer is to provide the destination number to the media gateway.

15. An apparatus as defined in claim 11, further comprising a log file parser to detect network devices associated with the destination number from the log file.

16. An apparatus as defined in claim 11, wherein the media gateway comprises a converter to convert a stream of time division multiplexed signals on a first network to an Internet protocol stream on a second network.

17. An apparatus as defined in claim 11, wherein the media gateway comprises a converter to convert an Internet protocol stream on a first network to a stream of time division multiplexed signals on a second network.

18. A machine readable storage device comprising instructions that, when executed, cause a machine to perform a method comprising:
    identifying a designated operation mode of a dialed destination number as one of fax-only or voice-only, the destination number dialed via a media gateway;
    blocking the destination number when negotiation tones are detected and the destination number is designated as voice only; and
    blocking the destination number when negotiation tones are absent and the destination number is designated as fax-only.

19. A machine readable storage device as defined in claim 18 further comprising instructions that, when executed, cause the machine to block a second one of the first plurality of destination numbers associated with an unauthorized network device.

20. A machine readable storage device as defined in claim 18 further comprising instructions that, when executed, cause the machine to at least one of convert a stream of time division multiplexed signals on a first network to an Internet protocol stream on a second network, or convert an Internet protocol stream on the second network to a stream of time division multiplexed signals on the first network.

* * * * *